July 1, 1947.    A. C. CIELL    2,423,293
PROCESS OF MAKING ABRASIVE WHEELS
Filed Nov. 19, 1943
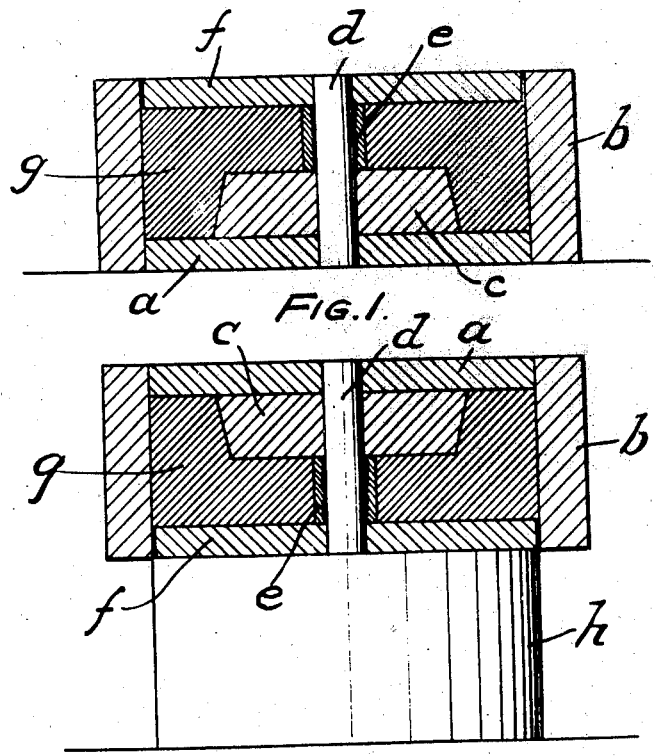
FIG. 1.
FIG. 2.
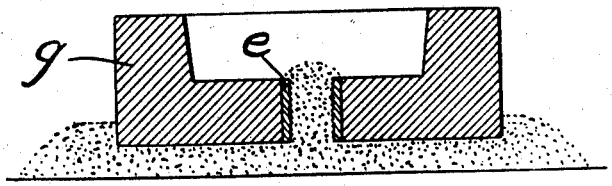
FIG. 3.
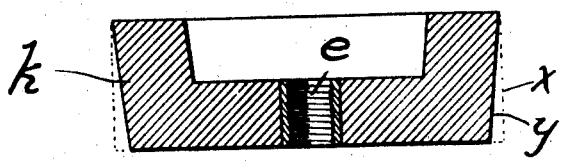
FIG. 4.
WITNESS:
INVENTOR
August C. Ciell
BY
Busser and Harding
ATTORNEYS.

Patented July 1, 1947

2,423,293

UNITED STATES PATENT OFFICE 2,423,293

PROCESS OF MAKING ABRASIVE WHEELS

August C. Ciell, Philadelphia, Pa.

Application November 19, 1943, Serial No. 510,880

1 Claim. (Cl. 51—293)

The object of my invention is to produce a grinding wheel of the vitrified bond type having a central hole reinforced with a threaded metal bushing. While the useful application of the invention is not limited to the production of vitrified type grinding wheels intended for any special use, it is particularly applicable to the production of grinding wheels of that type known as "snagging" wheels.

In the manufacture of grinding wheels provided with a central bushing it is known to mould the wheel with an axial hole and, after baking and cooling, to insert the metal bushing in the hole and secure it therein by means of any material, such as lead, Babbitt metal, resin cement or sulfur, surrounding the bushing. It is found difficult, by this method, to precisely centralize the bushing in the central hole and to insure against its displacement from that position during use.

According to my invention, the bushing is precisely centralized, is an integral part of the molded article, does not require the use of any material to unite it to the surrounding wheel and is baked with the mix, so that, at the conclusion of the baking operation, the bushing forms an integral part of the wheel; the wheel requiring no finishing operation in order to center the bushing.

In the manufacture of the wheel, the composition of the wheel is of importance and it is essential to follow rather closely the process of manufacture set forth in certain prior applications filed by me, reference being had particularly to an application filed March 9, 1943, Serial No. 478,516. The composition set forth in that application is abrasive material 67 to 92%, a binder-forming and porosity-inducing mixture comprising frits 6.5 to 20% and sodium silicate 1 to 6%, the sodium silicate being in smaller proportion than the frits, with, in most cases, an addition of carbonaceous material up to 7%. As an example of a suitable frits I have found especially effective one whose analysis includes mainly silica ($SiO_2$) 58.3, boron oxid ($B_2O_3$) 22%, sodium oxid ($Na_2O$) 16%, with incidental inclusion of aluminum oxid ($Al_2O_3$) 2.5% and potassium oxid ($K_2O$) 1.2%. It should be understood that the frits specified may not contain the oxides as such; it being customary, however, as is well understood in the art, to express such analysis in terms of oxids.

In the manufacture of "snagging" wheels, the following is an example illustrating a preferred composition:

| | Per cent |
|---|---|
| Aluminum oxid | 85.5 |
| Frits | 8.0 |
| Sodium silicate | 4.0 |
| Carbonaceous combustible material | 2.5 |

Other abrasive materials may be substituted for the aluminum oxide in the manufacture of grinding wheels other than "snagging" wheels. Sawdust is preferably employed as the carbonaceous material. The addition of small proportions of borax, calcium carbonate, magnesium silicate, china clay, saddler clay, OK clay, puerine clay, Albany slip clay, feldspar or flint, gypsum, zinc oxide, shellac, gum arabic, molasses, dextrine, goulic or mixed is not excluded, but such additions are unnecessary. Certain of these materials may be substituted, in whole or in part, for the constituents of the frits. Thus, if the frits does not contain sufficient silica, it may be added in the form, for example, of china clay; or, as previously stated, borax functions, as a flux, like the boron acid constituent of the frits.

All the materials of the starting mix are in solid dry form except the sodium silicate, which is viscous, but when added to the other constituents, does not affect the essentially dry quality of the mixture. The mixture may be poured into the mold, which may be of plastic or steel, like sugar or common salt. It is an essential feature of the process that the mixture should be deposited in the moulds in a substantially dry state, and that it should not be subjected to substantial pressure either before or after being run into the moulds. The dry mixture may be leveled off by means of any convenient tool, or may be flattened by any other suitable means.

The metal bushing is most conveniently inserted in the mold prior to the deposition of the mix.

No preliminary drying operation is necessary. The dry unpressed casting may be immediately placed in a kiln, wherein it is subjected to a temperature that should not be less than about 1500° F. A temperature of 1550° F. has been found satisfactory. A considerably higher temperature is permissible, but not advantageous, since any slight shortening of duration of baking thereby effected does not compensate for the expense of additional heat and in no wise improves the qualities of the finished wheel. However, the temperature should not reach the temperature of the melting point of the metal—preferably carbon steel—of which the bushing is composed.

Upon the completion of baking and cooling it is found that the bushing closely adheres to the body of the wheel and so remains during the entire period of its use. Starting with a mold whose central pin is carefully centralized, the bushing is necessarily concentric with the axis of the casting and remains fixed in that position during the baking and cooling periods and during subsequent use.

The baking period may vary from 6 to 36 hours dependent mainly on the size of the wheel, but in the case of wheels of average size, constituting by far the larger proportion of wheels in commercial use, a baking period of 8 hours will suffice; a corresponding period being allowed for cooling.

The finished grinding wheel exhibits the essential characteristics of grinding wheels made in accordance with the process set forth in my heretofore mentioned prior application.

In the drawings:

Fig. 1 is a cross-sectional view of the mold, with the mix deposited therein.

Fig. 2 is a cross-sectional view of the mold, containing the molded mixture, inverted and deposited on a support, prior to the removal of the mold from the contained casting.

Fig. 3 is a cross-sectional view of the casting in position in the kiln.

Fig. 4 is a cross-sectional view of the finished grinding wheel.

Referring first to Fig. 1: The mold is shown as a steel mold comprising a bottom plate $a$, a circular enclosing wall $b$, a frustro-conical block $c$ resting on the bottom $a$, and a pin $d$ extending through aligning central holes in the bottom $a$ and block $c$.

A bushing $e$, internally screw-threaded, is slipped over the part of the pin $d$ projecting above block $c$. The mix $g$ is then poured into the mold and is leveled off by means of a circular plate $f$, which is subjected to a light downward pressure sufficient only to flatten the top of the mix but not sufficiently to substantially reduce the volume of the mix.

The mold, with its enclosed casting $g$, is then inverted, as shown in Fig. 2, and deposited on a support $h$ having a circular contour corresponding to that of the mold wall $b$. The wall $b$ is tapped to loosen it from the casting and is then moved down until it clears the casting and the plate $f$. The bottom plate $a$, block $c$ and pin $d$ are then lifted off the casting $g$.

The casting $g$ is then placed on a bed of sand in the kiln, as shown in Fig. 3. The interior of the bushing $e$ is filled with sand; or it may be filled with any suitable heat-resistant material, such as an asbestos-graphite paint mixture.

The mix remains in the kiln for the length of time, while subjected to the temperature, hereinbefore specified, being thereafter allowed to cool in the usual way.

The finally baked wheel $k$, with the bushing $e$ firmly embedded therein, is shown in Fig. 4. Its external wall is then circular as shown by the dotted lines $x$. If it is desired that the wheel shall have a cup-shape, the material of the wheel between the dotted line $x$ and the full line $y$ is ground away by means of a grinding wheel of the silica bond type.

What I claim and desire to protect by Letters Patent is:

A process of making abrasive grinding wheels of the vitrified bonded type having a central bushing, which comprises slipping a bushing over and closely fitting the central part of an open-top annular mould, pouring the mixture to be moulded, while the same is in a dry state, into the mould within the space between the bushing and the outer wall of the mould, closing the top of the mould to thereby completely enclose the mixture within said annular space but without subjecting the mixture to substantial pressure, inverting the mould and its contained uncompressed mixture, removing the mould from the moulded mixture and the bushing, depositing the freed moulded mixture on a heat-resistant mixture and filling therewith the interior of the bushing and baking the freed moulded mixture at a temperature not less than about 1500° F. without subjecting it to substantial pressure for the time required to bind and sinter the same into an integral wheel body in which said central bushing is directly and permanently united thereto and located concentric to its axis.

AUGUST C. CIELL.

REFERENCES CITED

The following references are of record in the file of this patent:

UNITED STATES PATENTS

| Number | Name | Date |
| --- | --- | --- |
| 2,278,301 | Bauer | Mar. 31, 1942 |
| 2,250,580 | Gregory | July 29, 1941 |
| 1,981,970 | Sanford | Nov. 27, 1934 |
| 1,983,082 | Howe et al. | Dec. 4, 1934 |
| 1,997,957 | Wilson | Apr. 16, 1935 |
| 2,248,990 | Heany | July 15, 1941 |
| 2,281,525 | Milligan et al. | Apr. 28, 1942 |
| 2,342,121 | Ciell | Feb. 22, 1944 |
| 642,828 | Spohn | Feb. 6, 1900 |